United States Patent Office 3,099,139
Patented July 30, 1963

3,099,139
REFRIGERATING APPARATUS
Leonard J. Mann and David O. Stewart, Dayton, Ohio, assignors to General Motors Corporation, Detroit, Mich., a corporation of Delaware
Filed Apr. 16, 1962, Ser. No. 187,535
6 Claims. (Cl. 62—180)

This invention pertains to refrigerating apparatus and more particularly to the cooling of fluids such as water flowing through a pipe.

A number of problems are involved in cooling water to a certain temperature range when the flow is intermittent. Adequate cooling must be provided as soon as the water starts moving. Cooling must be reduced quickly when the water stops flowing to prevent freezing. It is also desirable to prevent short cycling of the cooling system.

It is an object of this invention to provide a control for cooling intermittently flowing water and other fluids which assure that the water supplied will be kept constantly within desired temperature limits and which will prevent excessive cooling and/or freezing of the water during periods of low flow or during stoppages of flow.

It is another object of this invention to provide a control for cooling intermittently flowing water and other fluids which will start cooling substantially when the water or other fluids start flowing and which will stop cooling substantially when the water or other fluids stop flowing, and which will keep the water or other fluid supplied between desirable limits with a minimum of cycling.

These and other objects are attained in the water cooler shown in the drawings in which the refrigerant and the water pass in opposite directions through a double pipe heat transfer unit. The water is piped from this heat transfer evaporator unit under the control of a solenoid valve to a suitable place where the cooled water is to be used. Separate thermostat wells are bonded to the inlet and the outlet end of the water tube. The switch which has its thermostat bulb in the well at the outlet end of the water tube is connected in shunt with the normally open contacts of a relay. Both are connected in parallel between one of the supply conductors and the sealed motor-compressor unit. In parallel with the sealed motor-compressor unit is the thermostatic switch having its thermostat bulb in the well at the inlet end of the water tube which is connected in series with the operating coil for closing the normally open contacts of the relay.

Normally, after any stoppage of water flow, the inlet thermostat will close first because it is set to close at a lower temperature and also because it is located at the water inlet. The motor-compressor unit, however, will not be started until the outlet thermostat closes to complete the circuit to the compressor motor and also to the condenser fan moor. Upon the flow of current, the solenoid will close the relay contacts to complete a shunt for the contacts of the outlet thermostat so that, even though the outlet thermostat may open, the motor-compressor unit will continue operation until the inlet thermostat opens. The inlet thermostat will remain closed normally as long as water flow continues and will not open until the water flow stops.

Further objects and advantages of the present invention will be apparent from the following description, reference being had to the accompanying drawings wherein a preferred embodiment of the present invention is clearly shown.

Figure 1:
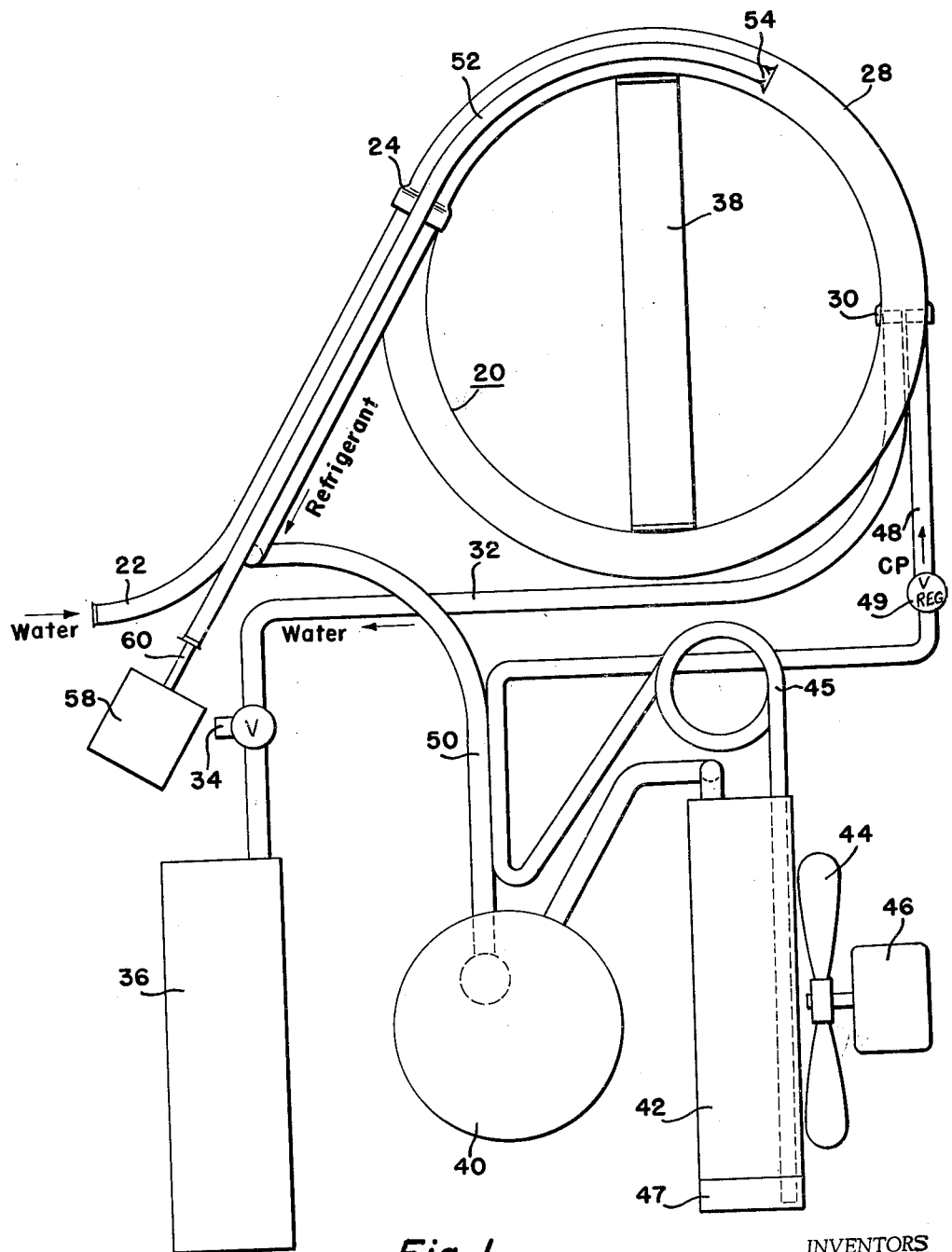
FIGURE 1 is a view, partly diagrammatic, of a water cooler embodying one form of my invention.
Figure 2:
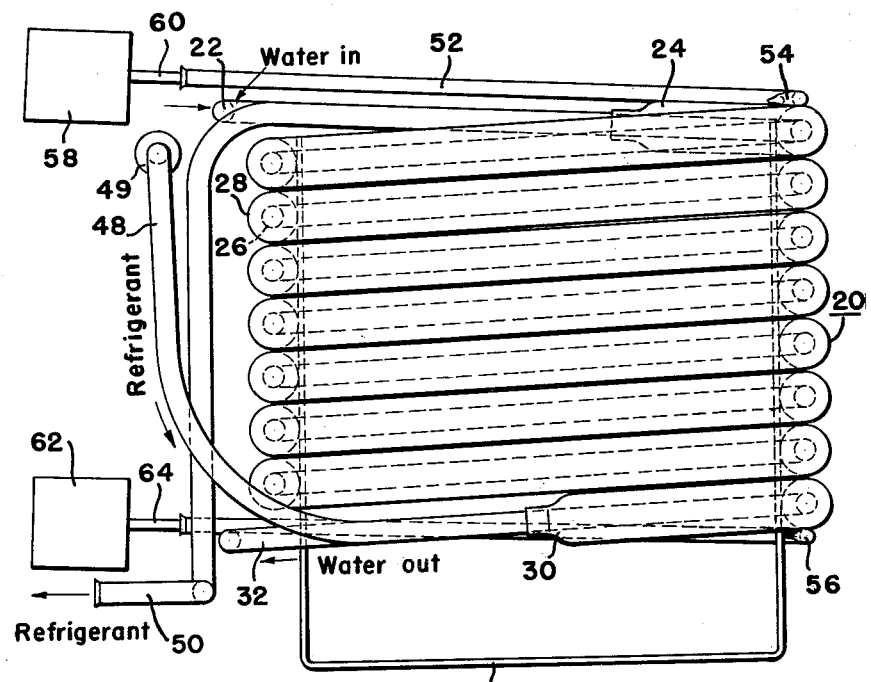
FIGURE 2 is a view in elevation of the refrigerant evaporator and water cooling coil.

Referring now to the drawings, and more particularly to FIGURES 1 and 2, there is shown a double pipe heat transfer coil 20 wound into a helix and forming a refrigerant evaporator. Water from the supply pipe 22 is fed to the top inlet 24 of the coil 20 in between the inner refrigerant pipe 26 and the outer pipe 28. After passing downwardly through the heat transfer evaporator 20 to the outlet 30, the water passes to the outlet pipe 32 under the control of a suitable solenoid valve 34 to any device, such as a dry cleaning machine, having need for water at a controlled cool temperature. The heat transfer coil 20 may be supported upon the U-shaped bracket 38.

A refrigerant liquefying unit including a sealed motor-compressor unit 40 which compresses the refrigerant and forwards the compressed refrigerant to a condenser 42 which is cooled by air propelled fan 44 driven by an electric motor 46. From the condenser 42, the liquid refrigerant flows to a liquid receiver 47 and thence to a liquid feed line 45 of which a part is in heat transfer relation with the suction conduit 50 connecting to the inlet of the sealed motor-compressor unit 40. The liquid feed line 45 connects to an expansion valve 49 connecting through the tube 48 with the water outlet end 30 of the heat transfer coil 20 and, particularly, to that end of the inner pipe 26 which serves as a refrigerant evaporator. The pipe 26 extends through the inside of the outer pipe 28 to the water inlet end 24 where it connects to the suction conduit 50.

To properly control the motor-compressor unit and the fan motor 46, there is bonded to the top of the heat transfer coil 20 adjacent the water inlet end 24, a thermostat bulb well 52 provided with a closed end 54. Directly beneath the coil 20 at the water outlet end 30 thereof, there is bonded to the outer pipe 28 a similar thermostat bulb well 56 also having the closed end bonded to the heat transfer coil 20. The well 52 therefore is substantially responsive to the water temperature at the inlet of the coil 20 while the well 56 is responsive substantially to the temperature of the water at the water outlet end 30 of the coil 20. The inlet thermostatic switch 58 has its thermosensitive capillary tube element 60 extending into the well 52 substantially to the closed end 54 thereof. The outlet thermostat 62 has its thermosensitive capillary tube element 64 extending into the well 56 substantially to the closed end thereof. The switches 58 and 62 each, for example, may be of the type shown in the Moody et al. Patent 2,906,132 issued September 29, 1959. Preferably, the thermostat 58 is set to close at 57° F. and to open at 52° F. while the thermostat 62 is set to close at 60° F. and to open at 55° F.

Figure 3:
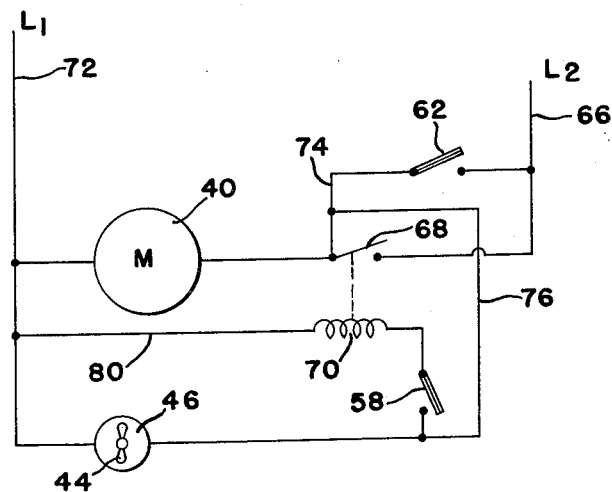
FIGURE 3 is a wiring diagram for controlling the operation of the water cooler.

Referring now more particularly to FIGURE 3, the supply conductor 66 is connected to the first terminal of the outlet thermostat 62. Connected in shunt with the outlet thermostat 62 are the normally open contacts 68 of a relay having an operating coil 70. The first terminal of the contacts 68 is connected to the supply conductor while the second terminals of both the outlet thermostat 62 and the contacts 68 are connected by the conductor 74 to each other and to the first terminal of the sealed motor-compressor unit 40. The second terminal of the sealed motor-compressor unit 40 is connected to the second supply conductor 72. The conductor 74, connecting the second terminals of the outlet thermostat 62 and the normally open contact 68 of the relay with the first terminal of the sealed motor-compressor unit 40 is also connected to the conductor 76 connecting with the first terminal of the fan motor 46 of which the second terminal connects with the second supply conductor 72. Connected to the conductor 76 is the first terminal of the inlet thermostat 58 of which the second terminal is connected to the first terminal of the operating coil 70 having its second terminal connected by the conductor 80 to the second supply conductor 72.

The purpose of this circuit arrangement is to normally have the motor-compressor unit 40 operating throughout the flow of water and to stop whenever the water flow stops. Normally, after any stoppage of water flow, the inlet thermostat 58 will close first because it is set to close at a 3° lower temperature and also because it is located at the water inlet end of the heat transfer unit 20. The motor-compressor 40, however, will not be started until the outlet thermostat 62 closes to complete the circuit to the motor-compressor unit 40 and to the fan motor 46. If there is no water flow at the time that the outlet thermostat 62 closes, the inlet thermostat 58 may remain open. Under such circumstances, the motor-compressor unit 40 will be stopped when the outlet thermostat 62 reopens. Under normal water usage, however, the outlet thermostat 62 will close when water flow starts. Likewise, the inlet thermostat 58 will normally close when water flow starts.

In the circuit arrangement of FIGURE 3 the closing of both the outlet thermostat 62 and the inlet thermostat 58 are necessary to energize the operating coil 70 of the relay having the contact 68. This assures operation of the motor-compressor unit 40 and the energization of the fan motor 46. Thus, even though the outlet thermostat 62 should open, the relay contacts 68 will essentially remain locked in by the continuation of the inlet thermostat 58 to remain in closed position to keep energized the energizing coil 70 of the relay. Since the water entering at the inlet normally keeps the inlet thermostat closed as long as water is flowing, the relay coil 70 will remain energized and the contacts 68 will remain closed substantially as long as water flows through the coil to keep operating the motor-compressor 40 substantially as long as water flows in an appreciable amount. Should the water flow reduce, however, the inlet thermostat 58 will open to prevent water in the unit 20 from freezing. This system of control avoids short cycling of the unit and provides a supply of cooled water within the desired temperature limits.

While the embodiment of the present invention, as herein disclosed, constitutes a preferred form, it is to be understood that other forms might be adopted.

What is claimed is as follows:

1. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, first thermostatic means substantially responsive to the temperature of the fluid adjacent the inlet of said first conduit means for stopping the circulation of said cooling medium through said second conduit means, and second thermostatic means substantially responsive to the temperature of the fluid adjacent the outlet of said first conduit means for starting the circulation of said cooling medium through said second conduit means.

2. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, first thermostatic means substantially responsive to the temperature of the fluid adjacent the inlet of said first conduit means for stopping the circulation of said cooling medium through said second conduit means, and second thermostatic means substantially responsive to the temperature of the fluid adjacent the outlet of said first conduit means for starting the circulation of said cooling medium through said second conduit means, said second thermostatic means being set to operate at temperatures below the operating temperatures of said first thermostatic means.

3. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, an electrical means for controlling the circulation of said cooling medium and having terminals, two supply conductors, a first thermostatic switch responsive substantially to the temperature of said fluid adjacent said outlet and having a first terminal connected to one of said supply conductors and a second terminal, a second thermostatic switch responsive substantially to the temperature of said fluid adjacent said inlet and having a third terminal connected to said second terminal and a fourth terminal, a normally open relay having a relay switch provided with fifth and sixth terminals electrically connected respectively to said first and second terminals, said relay for operating said relay switch having an electrical operating element provided with a seventh terminal connected to said fourth terminal and an eighth terminal connected to the other of said supply conductors, one of said terminals of said electrical means being connected to said second terminal and another terminal of said electrical means being connected to the other of said supply conductors.

4. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, an electrical means for controlling the circulation of said cooling medium and having terminals, two supply conductors, a first thermostatic switch responsive substantially to the temperature of said fluid adjacent said outlet and having a first terminal connected to one of said supply conductors and a second terminal, a second thermostatic switch responsive substantially to the temperature of said fluid adjacent said inlet and having a third terminal connected to said second terminal and a fourth terminal, a normally open relay having a relay switch provided with fifth and sixth terminals electrically connected respectively to said first and second terminals, said relay for operating said relay switch having an electrical operating element provided with a seventh terminal connected to said fourth terminal and an eighth terminal connected to the other of said supply conductors, one of said terminals of said electrical means being connected to said second terminal and another terminal of said electrical means being connected to the other of said supply conductors, said second thermostatic switch being set to open and close at lower temperatures than said first thermostatic switch is set to open and close.

5. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, an electrical means for controlling the circulation of said cooling medium and having terminals, two supply conductors, a first thermostatic switch repsonsive substantially to the temperature of said fluid adjacent said outlet and having a first terminal connected to one of said supply conductors and a second terminal connected to one of the terminals of said electrical means, the other terminal of said electrical means being connected to another supply conductor, a normally open relay having its relay switch connected in shunt with said first thermostatic switch, said relay having an electrical operating element, a second thermostatic switch substantially responsive to the temperature of said fluid adjacent said inlet, said second thermostatic switch and said electrical operating element being connected in series with each other and in series with said first thermostatic switch and said relay switch.

6. In a system for cooling a fluid, a first conduit means for conducting the fluid having an inlet and an outlet, a second conduit means extending in heat transfer relation with said fluid and having an inlet and an outlet, means for circulating a cooling medium through said second conduit means, an electrical means for controlling the circulation of said cooling medium and having terminals, two supply conductors, a first thermostatic switch responsive substantially to a temperature of said fluid adjacent said outlet and having a first terminal connected to one of said supply conductors and a second terminal connected to one of the terminals of said electrical means, the other terminal of said electrical means being connected to another supply conductor, a normally open relay having its relay switch connected in shunt with said first thermostatic switch, said relay having an electrical operating element, a second thermostatic switch substantially responsive to the temperature of said fluid adjacent said inlet, said second thermostatic switch and said electrical operating element being connected in series with each other and in series with said first thermostatic switch and said relay switch and in parallel circuit with said electrical means.

References Cited in the file of this patent
UNITED STATES PATENTS

| | | |
|---|---|---|
| 1,712,568 | Kritzer | May 14, 1929 |
| 2,511,582 | Grindrod | June 13, 1950 |
| 2,529,781 | Morrison | Nov. 14, 1950 |
| 2,758,446 | Schumacher | Aug. 14, 1956 |